United States Patent [19]

Rilling et al.

[11] Patent Number: 4,967,596
[45] Date of Patent: Nov. 6, 1990

[54] SWING VELOCITY INDICATOR

[75] Inventors: John F. Rilling, Roswell; R. W. Goodwin, Dunwoody, both of Ga.

[73] Assignee: GRT, Inc., Norcross, Ga.

[21] Appl. No.: 397,517

[22] Filed: Aug. 23, 1989

[51] Int. Cl.$^5$ ............................................. G01P 15/04
[52] U.S. Cl. ................... 73/492; 273/29 A; 273/186 A
[58] Field of Search ............... 73/492, 493, 379, 380; 273/26 B, 29 A, 186 A

[56] References Cited

U.S. PATENT DOCUMENTS

| | | | |
|---|---|---|---|
| 2,543,722 | 2/1951 | Hetzel | 73/493 |
| 3,097,534 | 7/1963 | Pasieka | 73/492 |
| 3,561,272 | 2/1971 | Davis | 73/492 |
| 3,572,706 | 3/1971 | Schroder | 273/26 B |
| 4,270,753 | 6/1981 | Maroth et al. | 273/186 A |
| 4,317,567 | 3/1982 | Blake | 273/26 B |
| 4,363,488 | 12/1982 | Maroth et al. | 273/186 A |
| 4,614,343 | 9/1986 | Radway | 273/186 A |
| 4,684,133 | 8/1987 | Maroth | 273/186 A |

*Primary Examiner*—John Chapman
*Attorney, Agent, or Firm*—Jones, Askew & Lunsford

[57] ABSTRACT

An apparatus for indicating the peak tangential velocity of a swung sporting goods implement such as a tennis racquet, golf club, or baseball bat, comprises a tube having a longitudinal bore. A seismic mass is slideably disposed within the bore of the tube, and a spring operates to pull the seismic mass toward the proximal end of the tube. A reset mass is normally captured at the distal end of the tube but is selectively released to slide within the bore of the tube. A peak velocity indicator is slideably disposed within the bore of the tube between the seismic mass and the reset mass, the peak velocity indicator frictionally engaging the inner walls of the tube such that it is displaceable longitudinally within the bore of the tube by an applied force but maintains its position within the bore of the tube once the applied force is removed. When the apparatus is affixed to the club or racquet with the longitudinal bore aligned with the shaft of the implement, swinging the implement generates a centrifugal force which displaces the seismic mass. The displaced seismic mass pushes the peak velocity indicator ahead of it, and the peak velocity indicator remains lodged in its forwardmost position of displacement at the completion of the swing. After the position of the peak velocity indicator is observed, the rest mass is released from its position at the distal end of the tube and slides down the tube to return the peak velocity indicator to its ready position.

5 Claims, 4 Drawing Sheets

SWING VELOCITY INDICATOR

TECHNICAL FIELD

The present invention relates generally to an apparatus for measuring the tangential or linear velocity of an object moving in a circular path, and relates more specifically to an apparatus for measuring the swing speed of a sporting goods implement such as a golf club, tennis racket, or baseball bat.

BACKGROUND OF THE INVENTION

An important factor in developing skill in many sports is the ability of the player to strike an object with an implement swung at high speed. For example, the power with which a tennis ball is hit is proportional to the velocity of the racquet head at the point of impact. Similarly, the distance which a golf ball will travel after having been struck with a golf club is dependent in large part upon the club head velocity at the point of impact with the golf ball. Also, the power which a baseball batter generates in striking a pitched ball is proportional to the velocity of the barrel of the bat when the ball is struck. Accordingly, it is advantageous for participants in these and similar sports to be able to generate maximum speed of the racquet head, club face, or bat barrel.

The path followed by the racquet head, club face, or bat barrel when swung by a player is essentially arcuate. The characteristic of an implement swung in an arcuate path which imparts kinetic energy to a struck object is the linear or tangential velocity component of the implement at the point of impact with the object. This tangential velocity component of the swung implement will be referred to hereinafter as the "swing velocity". To train players in these various sports to generate maximum swing velocity, it would be helpful to have some objective indicia of the swing velocity so that the effect of changes or refinements in swing technique on the swing velocity can be measured.

SUMMARY OF THE INVENTION

The present invention provides a means for objectively measuring the swing velocity of a tennis racquet, golf club, baseball bat, or other sporting goods implement. Stated generally, the present invention comprises a swing velocity indicator which is easily adapted to function on a variety of such implements, is easy to install and to remove, and is simple to use.

Stated somewhat more specifically, the present invention comprises an apparatus for indicating the peak tangential velocity of a swung sporting goods implement such as a tennis racquet, golf club, or baseball bat. The velocity indicator includes a tube having longitudinal bore therethrough and a seismic mass slideably disposed within the bore of the tube. A spring is operable to pull the seismic mass toward a first end of the tube. A reset mass is normally retained against the opposite end of the tube and is operable to selectively permit the reset mass to slide within the bore of the tube. A peak velocity indicator is slideably disposed within the bore of the tube between the seismic mass and the reset mass and frictionally engages the walls of the tube bore such that the peak velocity indicator is displaceable longitudinally within the bore of said tube by an applied force but maintains its position within the bore of the tube once said applied force is removed.

When the indicator is affixed to a tennis racquet, golf club, or the like with the spring mass end of the tube proximally disposed toward the player, centrifugal force generated by swinging the implement displaces the seismic mass outwardly within the bore of the tube. As the seismic mass is displaced, it pushes the peak velocity indicator along ahead of it. The extent to which the seismic mass is displaced within the tube is proportional to the tangential velocity of the swung implement. When the swing is completed, the seismic mass is drawn back to its initial position at the proximal end of the tube by the tension of the spring, but the peak velocity indicator remains lodged in its forwardmost location of displacement. The location of the peak velocity indicator can then be compared with a scale on the tube to provide an objective indication of the maximum swing velocity generated during the swing.

When the indicator has been read, it is easily reset by tapping the butt of the racquet or club against the ground, dislodging the reset mass from its retained position at the opposite or distal end of the tube. As the reset mass slides down the tube, it pushes the peak velocity indicator back to its ready position near the proximal end of the tube against the mutually facing end of the seismic mass. Inverting the indicator again causes the reset mass to slide back to its normal position at the distal end of the tube, where it re-engages the retainer to hold it in place.

Thus, it is an object of the present invention to provide an improved apparatus for measuring the peak tangential velocity of an object moving in an arcuate path.

It is another object of the present invention to provide a practice aid for use with tennis racquets, golf clubs, baseball bats, and the like which provides an objective indication of swing velocity.

It is a further object of the invention to provide an improved means for resetting a swing velocity indicator after use.

Other objects, features, and advantages of the present invention will become apparent upon reading the following specification, when taken in conjunction with the drawings and the appended claims.

DETAILED DESCRIPTION OF THE DISCLOSED EMBODIMENT

Figures 1, 2:
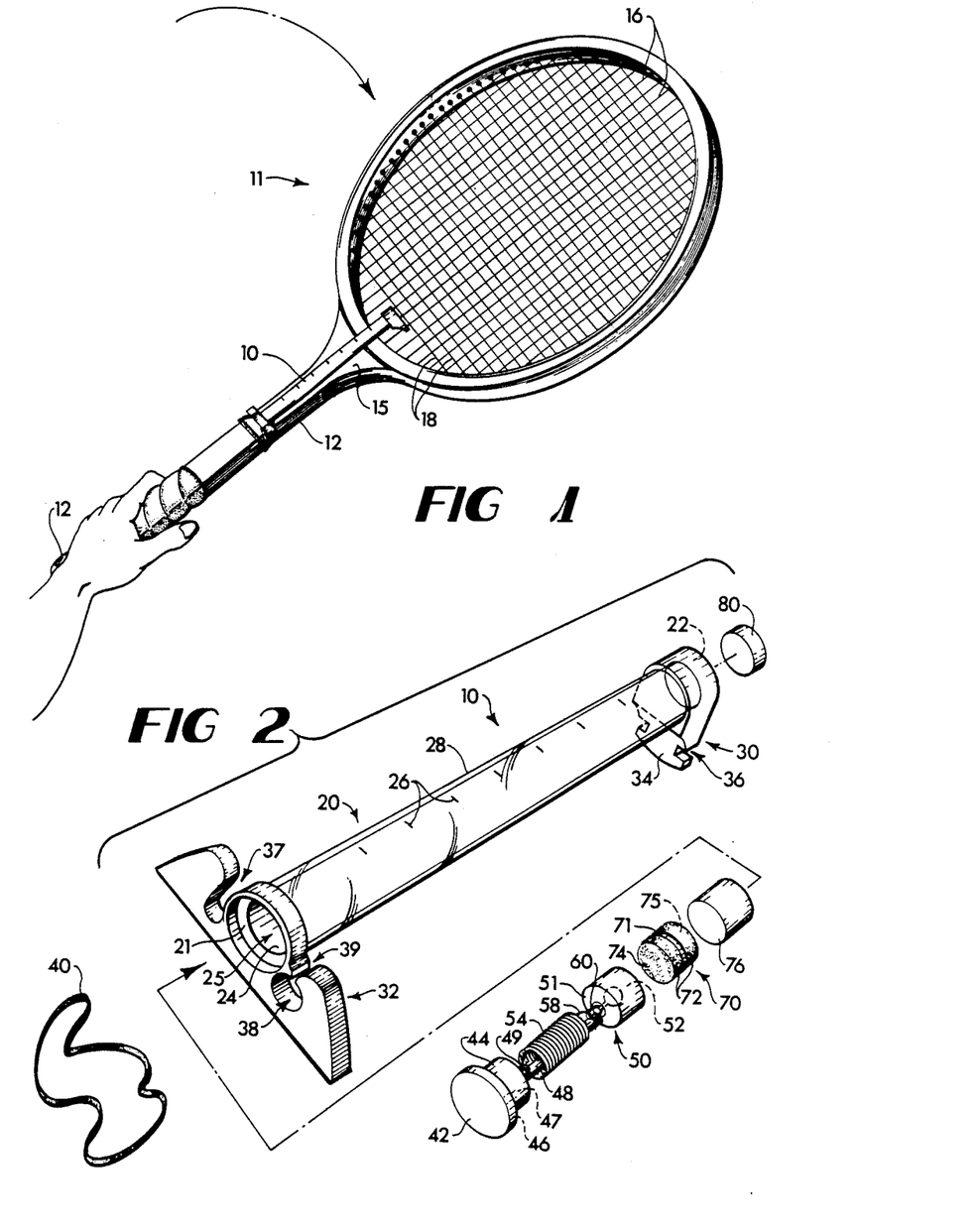
FIG. 1 is a perspective view of a first embodiment of a swing velocity indicator according to the present invention adapted for use in conjunction with a tennis racket.
FIG. 2 is an exploded perspective view of the swing velocity indicator of FIG. 1.

Referring now in detail to the drawings, in which like numerals indicate like elements throughout the several views, FIGS. 1 and 2 illustrate a swing velocity indicator 10 adapted for use in conjunction with a tennis racket 11. The racquet 11 shown in FIG. 1 is of conventional design and comprises an elongated shaft 12, a butt 13, a head 14, a throat 15, main strings 16 extending parallel to the axis of elongation of the shaft 12, and cross strings 18 running perpendicular to the main strings 16. It will be understood that the racquet 11 is described only to illustrate the environment of the swing velocity indicator 10 and does not comprise a part of the invention.

The swing velocity indicator 10 comprises a hollow tube 20 having a proximal end 21 and a distal end 22. The tube includes inner walls 24 defining a longitudinal bore 25. The tube 20 is advantageously comprised of a translucent material such as Plexiglass to permit viewing of objects in the bore 25 through the walls of the tube. A scale 26 is inscribed on the exterior surface 28 of the tube 20 for the purpose to be explained below. In the disclosed embodiment, the scale 26 and accompanying indicia are applied to the exterior surface of the tube by means of a decal.

A string engagement bracket 30 is mounted at the distal end 22 of the tube, and a throat engagement bracket 32 is located at its proximal end 21. The string engagement bracket 30 has a radially projecting flange 34 having a pair of notches 36 formed on opposing sides thereof, each of which notches is dimensioned to receive a main string 16 of the tennis racket 11 therewithin. The throat engagement bracket 32 has a first recess 37 formed on one side of the tube 20 and a second recess 38 in the opposing side of the tube. The second recess 38 has a narrow opening 39 at its upper end which is wide enough only to permit a rubber band 40 to be inserted therethrough and narrow enough to retain the rubber band within the second recess 38 once inserted.

The proximal end 21 of the tube 20 is terminated by an end cap 42. The end cap has a reduced cylindrical body portion 44 which is received within the bore 25 at the proximal end 21 of the tube 20 and snugly engages the interior walls 24 of the tube. A shoulder 46 at the upper end of the reduced body portion 44 abuts the proximal end of the engagement bracket 32. As can perhaps best be seen in FIG. 2A, the distal or interior end 47 of the end cap 42 has an elongated stop pillar 48 attached thereto. The stop pillar 48 includes a hook member 49 formed at its lower end.

A seismic mass 50 is slideably disposed within the bore 25 of the tube 20. The seismic mass 50 is generally cylindrical and has a first end 51 and a second end 52.

Figure 2A:
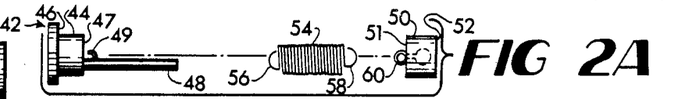
FIG. 2A is a side view of the end cap, spring, and seismic mass of the swing velocity indicator of FIG. 2, exploded further to reveal additional detail.
Figure 3:
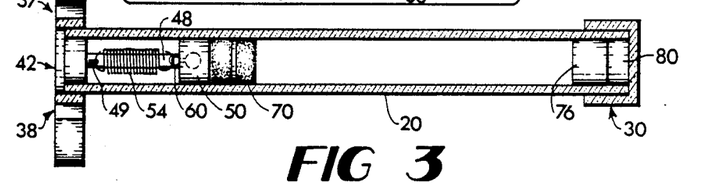
FIG. 3 is a top cutaway view of the swing velocity indicator of FIG. 1 depicting the indicator at rest and prior to use.

The seismic mass 50 is attached to the end cap 42 by means of a spring 54. A first end 56 of the spring 54 engages the hook member 49 of the stop pillar 48 on the distal end 47 of the end cap 42. The opposite end 58 of the spring 54 engages a swivel-mounted eyelet 60 affixed to the first end 51 of the seismic mass 50. The seismic mass 50 has an outer diameter slightly smaller than the inner diameter of the tube 20 to allow air to pass between the seismic mass and the interior wall 24 of the tube, for the purpose to be explained below.

The tension of the spring 54 draws the first end 51 of the seismic mass 50 snugly against the distal end 66 of the elongated stop pillar 48. The stop pillar 48 thus serves as a spacer element to maintain the spring 54 in a constant state of tension when the seismic mass 50 is at rest.

Disposed within the bore 25 of the tube 20 on the side of the seismic mass 50 opposite the spring 54 is a peak velocity indicator 70. The peak velocity indicator 70 of the preferred embodiment comprises a central narrow plastic disk 71 sandwiched between a pair of cylindrical elements 72 formed from a lightweight, semi-rigid material such as foam plastic so as to have minimal mass. The peak velocity indicator has a first end 74 facing the proximal end 21 of the tube 20 and a second end 75 facing the distal end 22 of the tube. The peak velocity indicator 70 is dimensioned to engage the interior wall 24 of the tube 20 snugly. An interference fit between the circumference of the peak velocity indicator 70 and the inner wall 24 of the tube 20 permits the peak velocity indicator to be displaced longitudinally within the bore 25 of the tube by an applied force but to maintain its position with respect to the tube once the applied force is removed.

Slideably disposed within the bore 25 of the tube 20 on the side of the peak velocity indicator 70 opposite the seismic mass 50 is a reset mass 76 of iron or other suitable ferrometallic material. The reset mass 76 is generally cylindrical and has an outer diameter slightly smaller than the inner diameter of the tube 20 so as to slide freely therewithin. The reset mass 76 is normally held within the bore 25 at the distal end 22 of the tube 20 by a magnet 80 terminating the distal end of the tube.

To mount the swing velocity indicator 10 to the tennis racket 11, the indicator is positioned with its axis of elongation at approximately a 90° angle to the main strings 16. The radially extending flange 34 of the string engagement bracket is inserted between the centermost two of the main strings 16 of the racket 11 below the cross string 18 which is nearest to the throat 15. The indicator 10 is then rotated to align its axis of elongation with the direction of the main strings 16, engaging the two centermost main strings with the opposing notches 36 in the flange 34. The throat engagement bracket 32 is then imposed against the throat 15 of the racket. A section of the rubber band 40 is inserted through the opening 39 in the second recess 38 to engage the rubber band within the second recess. The rubber band 40 is then wrapped around the throat 15 of the racket and engaged into the first recess 37 to secure the throat engagement bracket 32 against the throat of the racket. The swing velocity indicator 10 is now ready for use.

Referring now to FIGS. 3-6, the operation of the swing velocity indicator will be explained. In its "ready" configuration, depicted in FIG. 3, the seismic mass 50 is pulled against the distal end 66 of the stop pillar 48 by the tension of the spring 54. The peak velocity indicator 70 rests against the second end 52 of the seismic mass 50. At the distal end 22 of the tube 20, the reset mass 76 is held in place by the magnet 80.

Figure 4:
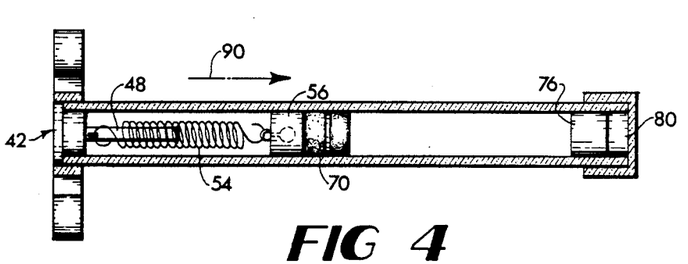
FIG. 4 is a top cutaway view of the swing velocity indicator of FIG. 1 showing the indicator in the process of measuring a swing velocity.

FIG. 4 depicts the operation of the swing velocity indicator 10 during swinging of the racquet 11. As the racket 11 is swung, centrifugal force urges the seismic mass 50 up the bore 25 of the tube 20 against the tension of the spring 54 in the direction indicated by the arrow 90. As the seismic mass 50 is displaced up the tube 20, it pushes the peak velocity indicator 70 ahead of it.

Figure 5:
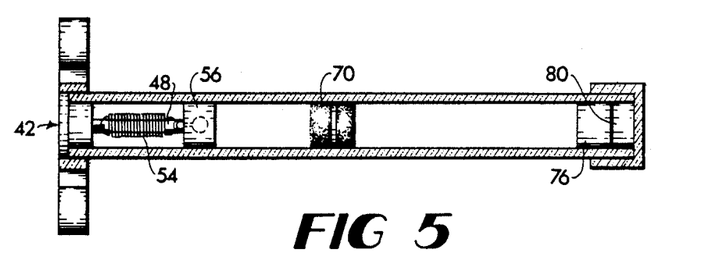
FIG. 5 is a top cutaway view of the swing velocity indicator of FIG. 1 showing the indicator after it has been used to measure a swing velocity.

As the swing is completed, the spring 54 pulls the seismic mass 50 back to its rest position against the distal end 66 of the stop pillar 48, as depicted in FIG. 5. The interference fit between the peak velocity indicator 70 and the inner wall 24 of the tube 20 is sufficient to retain the peak velocity indicator at its uppermost location of displacement. The location of the peak velocity indicator 70 can be compared to the scale 26 on the exterior wall 28 of the tube 20 to provide an indication of the swing velocity. It will be appreciated that the sandwich construction of the peak velocity indicator 70 facilitates reading of the location of the indicator with respect to the scale 26. Rather than comparing one or the other of the ends 74, 75 of the peak velocity indicator 70 against the scale, the narrow central disk 71 of the peak velocity indicator signifies the proper location of the indicator with respect to the scale 26. Thus, possible error resulting from the user inadvertently comparing the wrong one of the ends 74, 75 of the peak velocity indicator 70 against the scale 26, and thereby introducing inaccuracy and inconsisteny into the reading, is eliminated.

Figure 6:
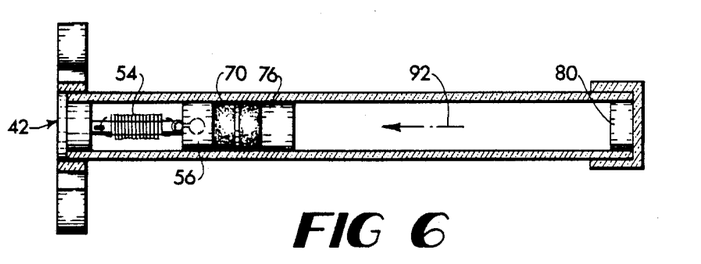
FIG. 6 is a top cutaway view of the swing velocity indicator of FIG. 1 depicting the resetting of the indicator after use to measure a swing velocity.

Once the swing velocity has been read, the indicator 10 is reset by tapping the butt 13 of the racket 11 against the ground with sufficient force to jar the reset mass 76 loose from the pull of the magnet 80 at the distal end 22 of the tube 20. As is illustrated by FIG. 6, the reset mass 76 slides down the tube 20 in the direction indicated by the arrow 92, pushing the peak velocity indicator 70 ahead of it, until the peak velocity indicator rests against the second end 52 of the seismic mass 50. The fit between the reset mass 76 and the inner wall 24 of the tube 20 permits air to pass therebetween to allow the reset mass to slide freely within the tube 20 without resistance from pneumatic damping. The racket 11 is then inverted from its butt-down orientation, causing the reset mass 76 to slide back down the tube 20 in a direction opposite to that indicated by the arrow 92. When the reset mass 76 reaches the distal end 22 of the tube 20, it is once again captured by the magnet 80 and held in place against the distal end of the tube. The interference fit between the circumference of the peak velocity indicator 70 and the inner walls 24 of the tube 20 maintains the peak velocity indicator imposed against the second end 52 of the seismic mass 50 as the tube 20 is inverted. After resetting, the swing velocity indicator 10 once again assumes the configuration depicted in FIG. 3.

Figure 7:
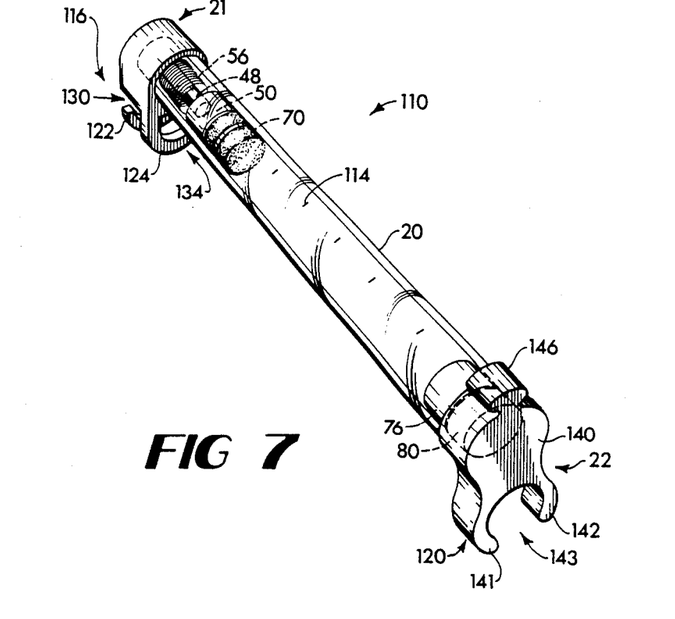
FIG. 7 is a perspective view of a second embodiment of a swing velocity indicator according to the present invention, adapted for use on a golf club.
Figure 8:
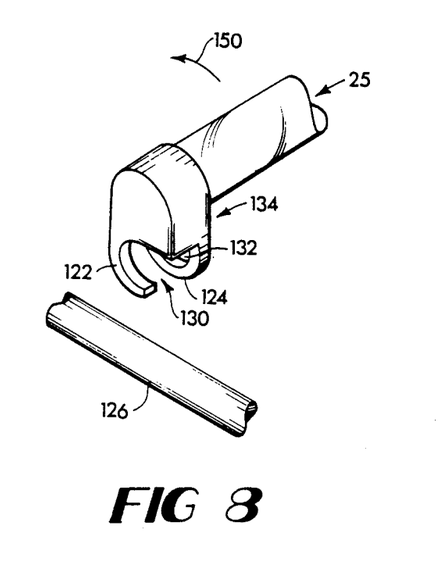
FIG. 8 is a partial perspective view of the swing velocity indicator of FIG. 7 depicting a step in the mounting of the indicator to the shaft of a golf club.
Figure 9:
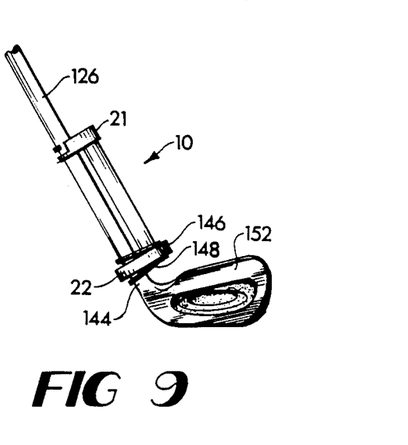
FIG. 9 is a perspective view of the swing velocity indicator of FIG. 7 depicting a subsequent step in the mounting of the apparatus to the shaft of a golf club.

FIGS. 7-9 disclose an alternate embodiment of a swing velocity indicator 110 adapted for use on a golf club 112. The swing velocity indicator 110 includes a plexiglass tube 20 having a proximal end 21 and a distal end 22. The tube 20 defines a bore 25 therewithin and includes a spring 56, seismic mass 50, stop pillar 48, peak velocity indicator 70, reset mass 76, and magnet 80 within the bore of the tube in the same manner as described above with respect to the swing velocity indicator 10 of the first embodiment. A decal of a scale 114 is applied to the outer surface of the tube 20.

A first mounting bracket 116 is mounted at the proximal end 21 of the tube 20, and a second mounting bracket 120 is mounted at the distal end 22 of the tube. The first mounting bracket 116 includes a pair of mutually opposing C-shaped arms 122, 124 lying in spaced-apart parallel planes perpendicular to the longitudinal axis of the tube 20. The spaced-apart distance between the parallel planes defined by the arms 122, 124 is slightly larger than the diameter of a golf club shaft 126. Each of the arms 122, 124 defines a recess 130, 132 therewithin, the recesses defining a longitudinal bore 134 which is parallel to the longitudinal axis of the tube 20. The recesses 130, 132 are open along the side of each arm 122, 124 and are arranged such that the openings are on opposing sides of the arms.

The second mounting bracket 120 includes a bracket body 140 perpendicular to the longitudinal axis of the tube 20. A pair of mutually opposing, spaced-apart, arcuate arms 141, 142 at the lower end of the bracket body 140 define a bore 143 therebetween which is parallel to the longitudinal axis of the tube. The bracket arms 141, 142 are resilient, and the spaced-apart configuration is such that the bracket body snap-fits onto the hosel 144 of the golf club shaft 126, with the shaft being retained within the bore 143. On the end of the bracket body 140 opposite the bracket arms 141, 142 is a cleat 146 adapted to secure a rubber band 148 to the swing velocity indicator 110 and around the golf club shaft 126 in the manner to be hereinbelow described.

The mounting of the swing velocity indicator 110 to the golf club 112 will now be described with reference to FIGS. 8 and 9. As depicted in FIG. 8, the swing velocity indicator 110 is positioned with the longitudinal axis of the tube 20 perpendicular to the longitudinal axis of the shaft 126. A portion of the shaft 126 spaced upwardly along the shaft from the hosel 146 is inserted into the opening between the spaced-apart, opposing C-shaped arms 122, 124 of the first mounting bracket 116. The swing velocity indicator 110 is then rotated in a plane parallel to the shaft 126 of the club 112 and about its proximal end 21 until the distal end 22 of the tube 20 faces the club head 152 and the longitudinal axis of the tube is parallel to the longitudinal axis of the shaft. Rotation of the swing velocity indicator 110 orients the shaft 126 within the recesses 130, 132 of the C-shaped arms 122, 124. The second mounting bracket 120 is then snapped onto the shaft 126 of the club 112, with the hosel 144 being retained between the bracket arms 141, 142 and within the bore 143 of the second mounting bracket. The interference fit between the second mounting bracket 120 and the hosel 144 fastens the lower end of the swing velocity indicator onto the shaft of the club. The rubber band 148 is then hooked over the cleat 146, wrapped around the shaft 126 of the club 112, and hooked over the cleat 146 again from the opposite direction. The gripping action of the rubber band 148 around the shaft 126 of the club 112 secures the indicator 110 against longitudinal displacement of the indicator with respect to the shaft 126.

Once the swing velocity indicator 110 is mounted to the shaft 126 of the golf club 112, the indicator functions in the same manner described above with respect to the velocity indicator 10. The centrifugal force effected by swinging the club 112 will displace the seismic mass 50 down the tube 20 against the tension of the spring 54, pushing the peak velocity indicator 70 ahead of it. As the swing is completed, the seismic mass 50 is drawn back to its initial position against the proximal end of the stop sleeve 64 by the tension of the spring 54, but the peak velocity indicator 70 remains lodged in the bore 25 of the tube 20 at its forwardmost point of displacement. The position of the peak velocity indicator 70 is read against the scale on the outer wall of the tube to provide an indication of swing velocity. The butt 154 of the club 112 is then tapped against the ground to dislodge the reset mass 76 from the pull of the magnet 80, and the reset mass slides down the tube 20 to impel the peak velocity indicator 70 back to its initial position imposed against the seismic mass 50. The club 112 is then inverted to its head-down orientation to permit the reset mass 76 to slide back down to the distal end 22 of the tube 20, there to be captured again by the magnet 80.

With the general operation of the disclosed embodiments 10, 110 having been described, the operative parameters of various aspects of the invention may now be more easily understood. For example, the weight of the seismic mass 50 and the spring constant of the spring 54 should be selected to control the range of outward displacement of the seismic mass during the swing. The displacement x of a spring having a spring constant K in response to a force $F_s$ is expressed by the following formula:

$$F_s = xK$$

The maximum force to which the spring-mass will be subjected is directly dependent upon the maximum centrifugal force which will be exerted during swinging of the implement. The centrifugal force $F_c$ exerted by the seismic mass m due to the effect of the swing at a distance $R_s$ from the center of the swing is expressed by the following formula:

$$F_c = ma_c = m \frac{V_s^2}{R_s}$$

At equilibrium, the centrifugal force $F_c$ acting on the seismic mass is resisted by an equal force $F_s$ exerted by the spring. Thus, $$m \frac{V_s^2}{R_s} = xK$$

Since the maximum velocity $V_s$ for a given application can be approximated reasonably accurately, and since the distance $R_s$ from the center of the swing is known, the weight m of the seismic mass 50 and the spring constant K of the spring 54 can be controlled to provide a maximum displacement x which is commensurate with the length of the tube 20.

(It will be appreciated that the foregoing calculations do not take into account the frictional force exerted by the peak velocity indicator against the walls of the bore, a force which acts in opposition to the centrifugal force $F_c$ exerted by the seismic mass. This frictional force is constant and independent of velocity and therefore may be taken into account in the scale against which the peak velocity indicator displacement is read. Similarly, in calculating the displacement of the seismic mass, the mass m should actually take into account not only the weight of the seismic mass but also a portion of the mass of the spring. Since the motion of the center of mass of the spring is ½ the motion of the seismic mass, the portion of the mass of the spring which should be taken into account in calculating the displacement of the seismic mass is ½ the mass of the spring.)

For the spring-mass arrangement to provide an accurate measurement of peak tangential velocity, it must satisfy two requirements. First, the characteristic, or natural, frequency of the spring-mass system must be much greater than the characteristic frequency of the swing. This requirement ensures that the seismic mass will move to the proper axial position in a time interval much shorter than the duration of the swing. The undamped natural frequency f a spring mass system having a mass m and a spring constant K is expressed by the following formula:

$$f = \frac{1}{2\pi} \sqrt{\frac{K}{m}}$$

Since the natural frequency of the spring-mass system is therefore directly proportional to the constant of the spring and indirectly proportional to the weight of the mass, it is a straightforward exercise to select a combination of seismic mass 50 and spring 54 which affords a natural frequency f which is much greater than the characteristic frequency of the swing.

Figure 10:
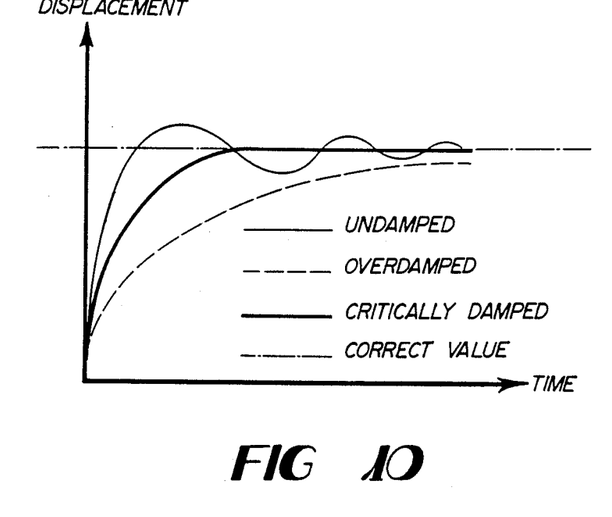
FIG. 10 is a graph depicting the movement of a sprung mass as a function of time in undamped, overdamped, and critically damped modes of oscillation.

In addition, damping must be introduced to prevent the outward displacement of the seismic mass 76 from overshooting the correct value. In the closed tube 20, if the circumference of the seismic mass 76 fit the walls of the bore 25 snugly, the air ahead of the moving seismic mass 50 would be compressed and would greatly damp the motion of the seismic mass. Conversely, if compression of air within the tube as the seismic mass moves were completely eliminated, i.e. the mass is undamped, the outward displacement of the seismic mass 50 would overshoot the correct value. Ideal damping, or "critical damping," is provided when the sprung seismic mass 50 moves as fast as possible without overshooting the correct value. FIG. 10 graphically depicts the swinging movement of the seismic mass 50 in undamped, overdamped, and critically damped modes of oscillation. The size of the air passage between the lateral surface 62 of the seismic mass 50 and the inner cylindrical wall 24 of the tube 20 is selected to provide critical damping, thereby preventing the seismic mass from overshooting its correct value without preventing it from reaching its correct value.

For critical damping, the damping constant D must be equal to 1:

$$D = \frac{B}{2\sqrt{Km}} = 1$$

where B is the damping coefficient. Since K and m have been chosen to provide the characteristics hereinabove explained, the air passages between the seismic mass and the tube bore are chosen such that $$B = 2\sqrt{Km}$$

In the disclosed embodiment, the air passages which provide the desired degree of damping are provided between the body of the seismic mass and the bore of the tube. However, it will be appreciated that alternative arrangements of air passages may be employed to provide the desired degree of damping, such as by providing a central longitudinal bore through the seismic mass.

The scales 26, 114 on the exterior surface of the tube 20 may express an objective indication of swing velocity in at least three different ways. First, the scales 26, 114 may be calibrated to express displacement of the peak velocity indicator 70 in terms of a club head or racquet head velocity expressed in, for example, miles per hour. Second, the scale may be calibrated to express displacement of the peak velocity indicator in terms of the distance which a projectile, for example a golf ball, would travel when struck by a club travelling at the corresponding swing velocity. Third, since neither a velocity reading nor a distance reading may have any real meaning to the user, the scale could simply be calibrated on a "one to ten" scale, thus providing a basis for comparison to other swings.

For a scale expressed in terms of the linear velocity of the club head or racquet head, the calibration of the scale may be accomplished based upon an understanding of the basic physical principles involved. As can be seen from the formulas previously set forth, at equilibrium the centrifugal force $F_c$ acting on the seismic mass is resisted by an equal force $F_s$ of the spring. Thus, $$m \frac{V_s^2}{R_s} = xK$$

Or, expressed differently, $$x = m \frac{V_s^2}{R_s K}$$

Since the mass, spring constant, and radius are constant, the deflection of the spring, and hence the displacement of the seismic mass, is proportional to the tangential velocity squared:

$$x \propto V_s^2$$

Since x varies with the square of the tangential velocity, the scale must be nonlinear. Further, these formulas calculate the tangential velocity of the swing velocity indicator, where the desired tangential velocity is more appropriately the head of the golf club or the "sweet spot" of the racquet. However, it is not possible (without interfering with the game) to mount the swing velocity indicator at the exact position on the sports implement where a velocity measurement is desired. Thus, the scale must be calibrated to compensate for the difference in velocities between the actual mounting location and the location whose velocity is desired to be measured.

Such compensation is easily accomplished by calibrating the scale based on the proportion between the distance of the swing velocity indicator from the axis of rotation and the distance of the club head or "sweet spot" from the axis of rotation. For example, if the radial distance from the axis of rotation to the "sweet spot" of a tennis racquet is 50" and the radial distance from the axis of rotation to the swing velocity indicator is 40", then the tangential velocity of the sweet spot will be 1.25 times that of the swing velocity indicator. Thus, by calibrating the scale on the swing velocity indicator to provide readings 1.25 times the actual tangential velocity of the swing velocity indicator, the scale will thereby provide an accurate reading of the "sweet spot" of the tennis racquet.

Based on the foregoing, it will be apparent that a knowledge of the spring constant, of the distance $R_s$ from the axis of rotation to the mounted swing velocity indicator, and of the distance from the axis of rotation to the club head or "sweet spot," will permit the scale to be calibrated in units of velocity, e.g. miles per hour, of the club head or "sweet spot". It will be appreciated, however, that certain inaccuracies may occur as a result of deviations from certain assumed values. For example, on the tennis racquet embodiment, the shape of the racquet may introduce a variance with respect to the mounting location of the swing velocity indicator, thereby affecting the distance $R_s$ and hence the accuracy of the scale. Further, in both the tennis racquet and golf club embodiments, the distance $R_s$ is measured from the axis of rotation and therefore includes not only the length of the club or racquet shaft but also the length of the player's arms. Since this length will vary from player to player, the scale may not be totally accurate for players with arms which are shorter or longer than average. Further, it is well known that golf clubs vary in length, with higher lofted irons having shorter shafts and lower lofted clubs having longer shafts. Again, variations in club shaft length introduce variables into the formulas which will result in some inaccuracy.

A second format for the scale would be appropriate primarily for use on the golf club embodiment. In this format, the scale would be calibrated according to the distance which a golf ball would travel when struck by a club head travelling at the measured velocity. Again, certain limitations are inherent in such a format. Club head velocity, as is well known, is but one factor in determining the distance which a golf ball will travel, other major factors including the loft of the club. A single scale could therefore be calibrated to provide a reading of a distance corresponding to only a single club, for example, the driver. Thus, the scale would provide inaccurate distance readings for clubs with higher lofts, even if swung with the same swing velocity.

Given these limitations, there may be advantages to be derived from a third scale format: an arbitrary numerical scale, for example, a "0 to 10" scale, whereby a swing velocity would result in a reading of a number which has no significance apart from providing an objective basis for comparison with other swings. With such an arbitrary numerical scale, the scale should be selected such that the largest number, e.g. "10", should be positioned at the maximum displacement which the seismic mass could reasonably be expected to reach. Again, since the displacement of the seismic mass varies according to the square of the tangential velocity, the scale is preferably nonlinear.

The swivel-mounted eyelet 60 by which the spring is attached to the first end 51 of the seismic mass 50 provides an important advantage in that the eyelet swivels in response to the tension of the spring 54 to prevent the seismic mass from "cocking" within the bore 25 of the tube 20. Such cocking would result in an increase in the friction between the seismic mass and the walls of the bore, thereby causing an inaccurate reading.

The length of the stop pillar 48 may be controlled to prevent any movement of the seismic mass unless a predetermined minimum swing speed is achieved. For example, if the minimum predetermined speed is 50 miles per hour, the centrifugal force exerted by the seismic mass at that speed may be ascertained based on the formulas set forth above. Based upon that calculated force, and knowing the spring constant of the spring, the mass of the seismic mass, and the frictional force of the peak velocity indicator, the displacement of the spring-mass at that swing velocity can be determined. The stop pillar is then dimensioned to extend beyond the "zero" or equilibrium position of the relaxed spring by a distance equal to that displacement. Thereafter, only swing speeds faster than the predetermined minimum will exert enough centrifugal force to move the seismic mass off the end of the stop sleeve.

Finally, it will be understood that the preferred embodiment of the present invention is disclosed by way of example, and that other modifications may occur to those skilled in the art without departing from the scope and spirit of the appended claims.

What is claimed is:

1. An apparatus for indicating the peak tangential velocity of a swung sporting goods implement comprising:
   a tube having first and second ends and having inner walls defining a longitudinal bore therethrough, said tube having a translucent portion through which the interior of said tube can be viewed, and said tube further having a scale inscribed thereon in juxtaposition with said translucent portion;
   a seismic mass slideably disposed within said bore of said tube;
   a spring operable to pull said seismic mass toward said first end of said tube;
   a reset mass;
   means for normally retaining said reset mass captive against said second end of said tube and being operable to selectively permit said reset mass to slide within said bore of said tube; and
   a peak velocity indicator slideably disposed within said bore of said tube between said seismic mass and said reset mass, said peak velocity indicator frictionally engaging said inner walls of said tube such that said peak velocity indicator is displaceable longitudinally within said bore of said tube by movement of said seismic mass or said reset mass but is retained within said bore of said tube at a location to which it is displaced by said seismic mass or said reset mass;
   whereby when said implement is swung, said seismic mass is moved toward said second end of said tube by centrifugal force, said seismic mass displacing said peak velocity indicator ahead of it as moves toward said second end of said tube;
   whereby said seismic mass is drawn back toward said first end of said tube by said spring upon completion of said swing, said peak velocity indicator frictionally engaging said inner walls of said tube to be retained at said location to which it is displaced by said seismic mass;
   whereby said location of said peak velocity indicator can be compared against said scale to provide an indication of the peak tangential velocity of said swung sporting goods implement; and
   whereby upon completion of said comparison, said reset mass is selectively operable to slide within said tube to displace said peak velocity indicator toward said first end of said tube.

2. The apparatus of claim 1, wherein one of said reset mass and said means for normally retaining said reset mass captive against said second end of said tube comprises a magnet, and wherein the other of said reset mass and said means for normally retaining said reset mass captive against said second end of said tube comprises a ferro-magnetic mass.

3. The apparatus of claim 1, wherein said peak velocity indicator comprises a central thin disk disposed between adjacent foam cylinders, said disk providing an indicium for comparison against said scale.

4. The apparatus of claim 1, wherein said seismic mass defines a damping channel for permitting air to pass from one side of said seismic mass to the other as said seismic mass slides within said bore of said tube, said damping channel being configured to permit airflow therethrough sufficient to permit said seismic mass to reach a correct value without overshooting said correct value.

5. The apparatus of claim 1, wherein said spring is attached to said seismic mass by means of a swivel-mounted eyelet, whereby said seismic mass is prevented from cocking within said bore of said tube in response to said spring pulling said seismic mass toward said first end of said tube.

* * * * *